March 11, 1924.  1,486,137
A. L. HALVORSEN
PROCESS OF RECOVERING CYANIDE
Filed June 20, 1921
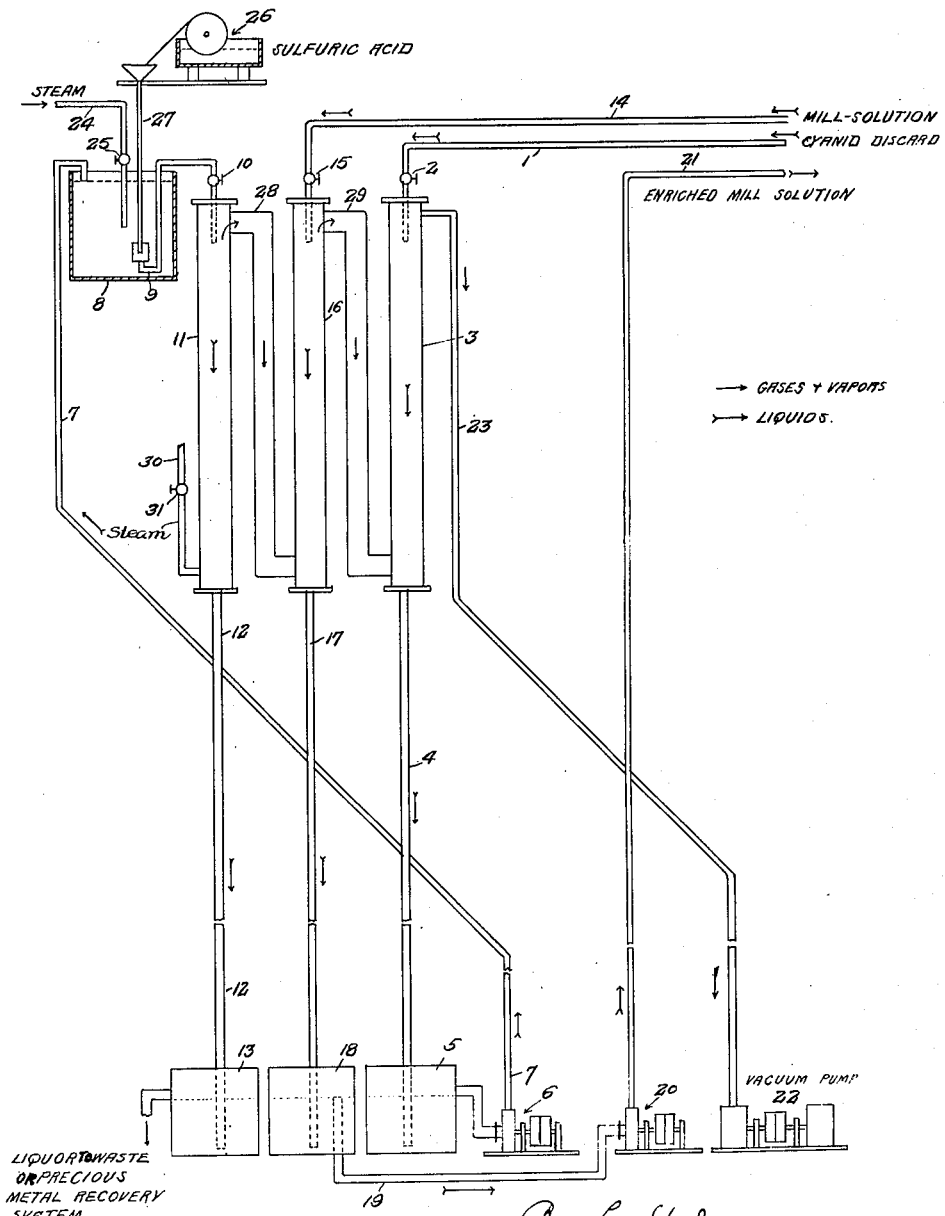
INVENTOR.
BY
ATTORNEY.

Patented Mar. 11, 1924.

1,486,137

UNITED STATES PATENT OFFICE

ARTHUR L. HALVORSEN, OF PERTH AMBOY, NEW JERSEY, ASSIGNOR TO THE MERRILL COMPANY, OF SAN FRANCISCO, CALIFORNIA, A CORPORATION OF CALIFORNIA.

PROCESS OF RECOVERING CYANIDE.

Application filed June 20, 1921. Serial No. 478,995.

*To all whom it may concern:*

Be it known that I, ARTHUR LUDWICK HALVORSEN, a subject of the King of Norway, residing at Perth Amboy, in the county of Middlesex and State of New Jersey, have invented certain new and useful Improvements in Processes of Recovering Cyanide, of which the following is a specification.

This invention relates to a process to prevent the loss of the cyanide, in cyaniding processes, by recovering the cyanide from the waste mill solution (hereinafter referred to as "mill discard"). In the present routine of practice in mills for extraction of silver and gold from ores and concentrates by cyanide solutions, considerable cyanide and an appreciable amount of precious metals are daily lost, by being carried away from the mills in the form of mill discard (including old liquors which have been used until considered no longer fit for use).

The extent of this cyanide loss at present depends largely on the degree of concentration of cyanide in the solutions in use for extraction of the precious metals, i. e., the higher the concentration of cyanide in the mill solution the higher will be the loss of cyanide in the final discard as a rule. The loss is, therefore, most important in silver extraction mills, where stronger solution is necessary, and may be relatively unimportant and negligible in straight gold ore extraction.

For this reason the usual practice is to employ as weak a solution for extracting as is consistent with satisfactory extraction of the silver and there exists always the danger of carrying this economy so far that the degree of extraction may suffer.

In many cases, impurities in the solution retard extraction and lower the final degree of extraction of the precious metals. Such injurious amount of impurities is due to the accumulation caused by the constant re-use of the same solution in a continuous cycle of extraction and precipitation (i. e. extraction of silver from the ore and precipitation of the silver from the solution by zinc), impurities usually harmful to efficient extraction being introduced during both these operations while only comparatively small amounts of these dissolved impurities are being daily disposed of as discard, the larger part being returned to the mill cycle, as they could not be removed from the mill cycle except by discarding at the same time equivalently large amounts of cyanide.

There is probably no doubt that most silver extraction mill operators could improve extraction from one or two to several per cent, if they were at liberty to keep mill solutions stronger, and especially purer, without thereby causing prohibitive losses of cyanide.

One important object of this invention is to accomplish this, i. e., to provide a process of continuously removing and reclaiming the total cyanide from any mill discard, so reliable, simple and economical that it may be practiced in any mill to relieve the operator of any worry about losses of cyanide in the daily mill discard and to make possible to discard impure solutions more freely. A further important result is that by this process, I completely precipitate and recover the silver, copper, etc., contained in the mill liquor under treatment.

The process involves the treatment of cyanide containing solutions (preferably "mill discard" or like solutions) with an acid much stronger than HCN, under particular conditions described below, and the recovery of the HCN evolved, preferably in an alkaline mill solution.

It is especially the problem of completely removing the very small amounts of HCN from the very large bulk of solution in which it is dissolved, which has presented technical and economical difficulties sufficiently serious to discourage attempts to reclaim cyanide from mill discard, and tens of millions of pounds of available cyanide have been mechanically discarded since the cyanide process was introduced in hydro-metallurgy for extraction of silver and gold.

I have found that by simply subjecting the acidified solution to a reduction of pressure corresponding to a boiling point of water lower than the temperature of the solution, the HCN will be immediately carried off by a small amount of water vapor, so completely that substantially 100% of the total cyanogen indicated by titration to be present in the solution, as well as the HCN liberated from the copper and silver, double cyanides, is taken off in the form of HCN, and is subsequently fixed by an alkali or an alkaline earth, the water vapor being condensed, yielding its latent heat to mill solution or partly to more of the discard solution to pre-heat same. This latent heat may be partly used to pre-heat more of the discard solution which is to be similarly treated.

Having pointed out the objects of the process, and also in a general way the procedure and usefulness of the process, I shall now give a more detailed description of operation.

The accompanying drawing represents a diagrammatic sectional elevation of a preferred form of apparatus for carrying out the process.

I use continuous flows of solution as follows:

Discard solution is drawn through pipe 1 and valve 2 into the vertical pipe or tower 3, where it is distributed over a suitable filling, such as wooden grates (not shown); it leaves the bottom of 3 and flows through the smaller pipe 4 and the seal 5 into the suction side of a pump, such as the small centrifugal pump 6. From here it is pumped through pipe 7 into an elevated tank 8, from where it is drawn through lead pipe 9 and valve 10 into a similar tower or pipe 11. Here it is distributed over contact surfaces, such as wooden grates (not shown). The liquid then leaves at the bottom of 11 through pipe 12 and seal 13, going from here through a filter to retain the precipitate (which will usually be found to contain the bulk of the precious metals and copper which were in the mill discard treated). In case the liquor still contains any dissolved precious metals or copper, it may go first to a precipitation launder to be precipitated by scrap base metals or sulfids, (this not being usually necessary) and then to the filter. The solution, being at this stage practically neutral or very slightly acid and containing no available cyanide or only a trace, allows any trace of silver and gold to be readily replaced by the more positive base metals, such as scrap iron or equivalent.

Mill solution, suitably reinforced with an alkali such as lime, if required, is drawn through pipe 14 and valve 15 into a similar tower or pipe 16 where it is distributed over a contact surface, such as wooden grates (not shown). It leaves, enriched by recovered cyanide, through pipe 17 and flows through seal 18 and pipe 19 to the suction side of a pump, such as a small centrifugal pump 20 and is pumped back into the mill solution system through pipe 21.

The evacuation of the system is taken care of by the vacuum pump 22 connected to the system by pipe 23.

The discard solution by its passage through 3 is pre-heated, as will be explained, to within a few degrees of the boiling point corresponding to the degree of vacuum in the system. It may preferably be further warmed up in the small tank 8 by steam introduced through pipe 24 and valve 25 to the desired number of degrees above the point at which it is due to boil when entering the reduced pressure system.

Sulfuric acid is fed by the acid feeder 26 through the lead funnel and pipe 27 into the solution at the suction end of pipe 9, and is drawn, mixed with the solution, through control valve 10 into 11.

While the extremely small amounts of HCN shows very little tendency to leave the barely acid and only slightly warm solution under atmospheric pressure, it is carried off immediately by the water vapor as soon as the solution enters the reduced pressure system.

The water vapors with the HCN pass through pipe 28 into pipe 16 where all the HCN is absorbed and fixed by the alkaline mill solution and a substantial part of the water vapor is condensed by the same solution, which returns to the mill cycle with its increase of pure free cyanide as well as heat equivalent to the latent heat of the amount of vapor condensed.

Any balance of water vapor (such balance may be increased or reduced at will by regulation of the valve 15, or to some extent by the valves 25 or 31, etc.,) passes through pipe 29 into 3 to meet and to be condensed by a new supply of discard solution suitably preheating the same preparatory to treatment.

The latent heat of the steam and other vapor generated in 11 being usefully employed to increase the temperature of mill solution (which otherwise in silver extraction practice is heated by other means) and also to preheat new supply of discard solution, there is no particular reason to limit the amount of evaporation to the least possible, and I prefer to ordinarily cause as much as two or even three per cent of the discard solution to evaporate. To effect this the solution temperature is either increased before entering pipe 11 an equivalent number of degrees above the boiling point corresponding to the degree of vacuum maintained in the system, or the heat required for evaporation, or some portion thereof, may be supplied in the form of steam, introduced through pipe 30 and valve 31.

While the vapor pressure of a solution containing cyanide and sulfuric acid is somewhat lower than that of pure water, the solutions which I employ are always weak so that the presence of the acid and salt have no material effect on the vapor pressure or boiling point of the solution. The pressure is so much reduced (i. e., the vacuum so high) and the temperature of the liquid so high, that when the heated acidified liquid is introduced into 11, brisk ebullition is effected, the water vapor formed rapidly carrying away even the last traces of the HCN.

The most suitable degree of vacuum to be maintained in the system depends on temperature conditions at the individual mills, i. e. on the temperature of the discard solution and mill solution or water available for condensing the vapors.

It is not as a rule advisable to reduce the pressure so far that the corresponding boiling point of water comes below the temperature of the solutions in the mill, since such procedure would make it impossible to use the mill solution to condense the vapors used for carrying off the HCN.

In exceptional cases, conditions may be such that it would be most economical to evacuate to a boiling point substantially below the natural temperatures of the discard and mill solutions, making it unnecessary to heat the discard solution preparatory to treatment, but making it necessary on the other hand to have available sufficiently cold water to condense the vapors, after HCN has been removed by means of lime or caustic soda solution, as it is hardly economical to depend on sufficient capacity of the vacuum machinery to exhaust the vapor without making use of condensation.

I ordinarily operate with a degree of vacuum which may be obtained by any satisfactory industrial vacuum pump for high duty performance without over-taxing the same, preferably, however, not materially less than 29 inches of vacuum, (at sea level, or a lower degree of vacuum if at a substanitally higher level) in tower 11, and I may heat the solution before entering, depending somewhat on the cyanide content and the nature of the solution as well as on the degree of vacuum conveniently maintained by the pump, to between 35° C. and 50° C., more or less.

I may vary the amount of steam introduced through pipe 30 from nothing up to as high as 35 pounds or more per ton of discard solution entering 11.

I feed sulfuric acid, usually at the rate of 1.5 pounds for each 1 pound NaCN (i. e. for solution testing 1 pound total NaCN per ton, I feed 1.5 pound acid). This amount will ordinarily more than take care of any alkalinity of the solution, in addition to furnishing acid to react with all the cyanide present. In case the solution is abnormally high in alkali, of course more acid should be added. It is obviously necessary to add enough acid to combine with the protective alkali and the metal or metals of the cyanide present.

Tests indicate that I can recover regularly over 95% of the total cyanide indicated by a standard total cyanide test to be present in the solution.

Of the practical advantages of the process I mention the following:

It is continuous and requires very little attention.

It depends on no delicate adjustments, any unnecessary excess of acid or heat being at the worst wasteful, but not harmful.

It gives reliable and complete recovery even from very weak solutions.

Solutions and vapors are very dilute at all stages of the process, excluding any danger by carelessness or accident.

The entire amounts of copper, silver and the like are found to be precipitated within the tower or pipe 11, and these can be caused to settle out in the trap 13, whereby their recovery is easily and cheaply effected. It accordingly is unnecessary, in many cases, to conduct this solution through a system in which it is treated with metals or sulfids.

Due to the extremely rapid escape of the HCN from the solution at reduced pressure and the simplicity of condensation and fixation, the installation required is small and of low cost, and the process may be installed and used profitably by any large or small silver cyanide mill.

It will of course be understood that the system 3—29—16—28—11 will be air-tight, to maintain the desired vacuum therein, while the pipes 4, 17 and 12 will be long enough for maintaining the desired vacuum.

I claim:

1. A process of recovering cyanide from cyanide-containing mill solution which comprises introducing a warm cyanide solution with sufficient acid to acidify the same, into a vacuum receptacle, and allowing the same to boil therein, bringing the resulting gases and vapors, while under pressure below atmospheric, into contact with an alkaline absorbent liquor to absorb the hydrocyanic acid therefrom, bringing the remaining vapors containing steam into contact with ingoing mill solution, each of said steps being operated continuously.

2. A process of recovering cyanide from cyanide-containing mill solution which comprises introducing a warm cyanide solution with sufficient acid to acidify the same, into a vacuum receptacle, and allowing the same to boil therein, adding further amounts of heat to the solution while in said vacuum, bringing the resulting gases and vapors, while under pressure below atmospheric, into contact with an alkaline absorbent liquor to absorb the hydrocyanic acid therefrom, bringing the remaining vapors containing steam into contact with ingoing mill solution, each of said steps being operated continuously.

3. A process of treating cyanide solutions to recover the cyanide and any dissolved metals therefrom, which comprises replacing the cyanogen there by an acid radical stronger than cyanogen to form free HCN and precipitate metal cyanides, removing the HCN together with and by means of an amount of water vapor introduced into the solution while subjecting the same to such high vacuum as to prevent partially or completely any permanent condensation of the vapor in the same, fixing the HCN, removing the precipitated metals from the treated solution.

4. A process of recovering cyanides from waste solutions containing the same which comprises heating the solution, replacing the cyanogen therein by an acid radical stronger than cyanogen, removing the hydrocyanic acid thereby formed together with and by means of an amount of water vapor evolved from the waste liquor while subjecting the same to such high vacuum as to prevent partially or completely any permanent condensation of the vapor in the same, and fixing the hydrocyanic acid.

5. A process of recovering cyanogen from mill waste solutions containing a small amount of cyanids and containing impurities, which comprises preheating such solution, acidifying such solution, introducing such acidified solution into a chamber in which such a degree of vacuum is maintained that a portion of the water is evaporated and substantially all of the hydrocyanic acid is freed from the solution and carried off by the water vapor evolved, and bringing the vapors and gases into contact with a mill solution containing alkali in excess to condense the water vapor and to absorb the HCN.

6. A process of treating waste cyanide solution from metallurgical operations, which comprises bringing said solution into a vacuum chamber and there subjecting the same to the action of water vapor, adding a strong acid to the said liquor and again bringing the same into a vacuum chamber, such vacuum being sufficient to cause the cyanide solution to boil and give off water vapor and hydrocyanic acid, and further heating the cyanide solution after the first step of the process and before the end of the second vacuum treatment, bringing the water vapor and hydrocyanic acid thereby produced into contact with an alkaline absorbent liquid for absorbing the hydrocyanic acid, and bringing any remaining water vapor into the first mentioned step of the process, the degree of vacuum in the operation of treating with water vapor, operation of liberating water vapor and hydrocyanic acid, and operation of absorbing hydrocyanic acid being substantially the same.

In testimony whereof I affix my signature.

ARTHUR L. HALVORSEN.

Witness:
CHAS. L. STEUERWALD.